RUSSELL B. MATTHEWS INVENTOR.

BY *G. J. De Angelis*

ATTORNEY.

United States Patent Office 3,445,174
Patented May 20, 1969

3,445,174
**FUEL BURNER CONTROL UTILIZING THERMO-
COUPLE TRIGGERED SILICON CONTROLLED
RECTIFIER**
Russell B. Matthews, Goshen, Ind., assignor to Penn
Controls, Inc., Oak Brook, Ill.
Filed Dec. 1, 1967, Ser. No. 687,214
Int. Cl. F23q 9/08; H01h 47/26
U.S. Cl. 431—59                              6 Claims

ABSTRACT OF THE DISCLOSURE

Fuel feeding means are energized through a silicon controlled rectifier which is fired by a hot thermocouple. A saturable reactor couples the gate of the rectifier to the thermocouple. The reactor comprises two magnetic cores separated by electrical insulating and nonmagnetic material, which cores are encircled in common by primary and secondary windings to provide two separate magnetic circuit paths interconnecting these windings. A control winding is provided for each of the magnetic cores. The control windings are interconnected electrically in series and magnetically in opposition for energization by the thermocouple. Under cold thermocouple conditions, the voltage induced in each of the control windings is substantially cancelled to provide zero current flow therein, obviating false triggering of the rectifier by voltage generated in the extremely low impedance control winding circuit.

Figure 1:
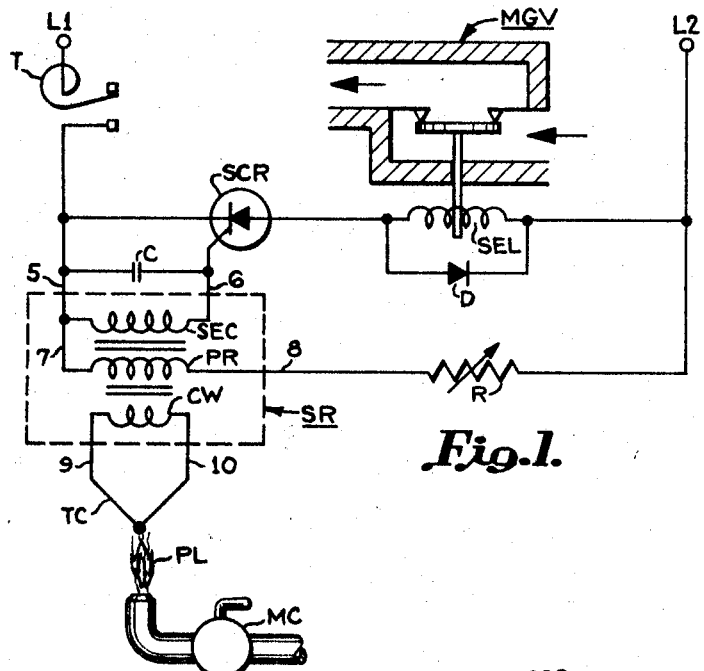

The invention relates to fuel burner controls utilizing thermocouple flame sensing means and more particularly to such controls in which the fuel feeding means is actuated by means of a silicon controlled rectifier which is triggered by the thermocouple.

In present day fuel burner controls utilizing silicon controlled rectifier and thermocouple flame sensing means, the power generated by the thermocouple is extremely minute, requiring substantial amplification in order to control firing of the rectifier. Attempts have been made to attain such amplification by coupling the thermocouple to the gate of the silicon controlled rectifier by means of a pulse transformer. However, such attempts proved impractical in view of the limited power available from present day thermocouples. The power produced by a thermocouple is normally in the area of one milliwatt. In addition, the coupling must be such that unwarranted false operation of the fuel feeding means is minimized. This is especially true in fuel burner controls for systems utilizing gaseous fuel, which fuel provides a much greater hazard than liqiud fuel. This safety requirement necessitates that the ampere-turns of the thermocouple circuit be so limited as to prevent the unwarranted generation of voltages in the relatively low impedance thermocouple circuit from false triggering the rectifier under cold thermocouple conditions.

It is, therefore, an object of the invention to provide an improved control for fuel burners utilizing silicon controlled rectifiers and thermocouple flame sensing means.

It is a further object to provide such a control which utilizes a unique coupling means of the thermocouple to the silicon controlled rectifier for firing the latter, while minimizing misoperation.

In carrying out the invention according to the preferred embodiment of the fuel burner control, fuel feeding means is energized through the anode-cathode circuit of a silicon controlled rectifier which is connectable across an alternating power source through a fuel demand switch. A thermocouple is coupled to the gate of the silicon controlled rectifier by means of a saturable reactor to cause the rectifier to fire and operate the fuel feeding means, when the thermocouple is heated. The saturable reactor comprises a secondary winding connected across the gate-cathode electrodes of the rectifier and a primary winding connected across the alternating power source through an adjustable resistor and the fuel demand switch. The control winding for the saturable reactor is connected across the thermocouple. The magnetic core of the reactor is divided into two sets, each of an equal number of laminations, the sets being spaced apart by a spacer of electrically insulating and nonmagnetic material. The secondary and primary windings encircle both core sets in common. The control winding comprises two individual coils, each encircling an associated set of the core and connected electrically in series and magnetically in opposition, one with the other. With this arrangement voltages induced in each of the control winding coils due to current flow through the primary winding under "cold" thermocouple conditions substantially cancel each other, obviating the generation of a false firing signal by the reactor to the gate of the silicon controlled rectifier. However, under "hot" thermocouple conditions, sufficient amplification of the relatively weak thermocouple signal is attained by the saturable reactor to fire the silicon controlled rectifier and cause actuation thereby of the fuel feeding means.

Features and advantages of the invention will be seen from the above, from the following description of the preferred embodiment when considered in conjunction with the drawing and from the appended claims.

Figure 2:
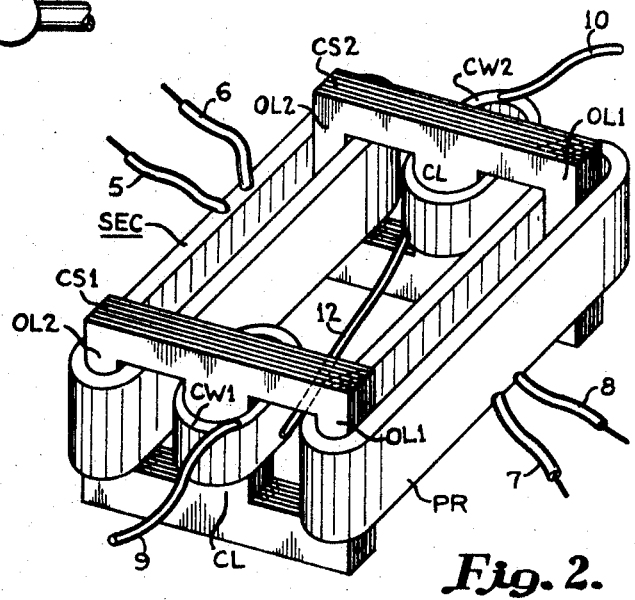

In the drawing:

FIG. 1 is a simplified schematic wiring diagram of a control for a fuel burner which, for convenience, has been shown as utilizing gaseous fuel controlled by a gas valve designated MGV, and embodying the invention; and FIG. 2 is a diagrammatic, fragmentary and partially exploded perspective view, greatly enlarged, of the saturable reactor SR or FIG. 1 utilized to couple the thermocouple to the gate of the silicon controlled rectifier.

For convenience, in the preferred embodiment the control has been applied to a gas burner utilizing a standing pilot flame to heat the thermocouple, the pilot gas being fed through a manual cock in the gas line and the flame lit manually. It is nevertheless to be understood that the invention is just as applicable to other systems, as for example, to those in which the pilot flame is automatically lit each cycle of burner operation by means of auxiliary relay means providing fuel to the pilot and causing energization of an electric igniter in any convenient manner. The invention is also applicable to systems where the thermocouple is heated by means other than a pilot flame, as for example, by direct electric spark where the thermocouple acts as one of the electrodes of the igniter.

With reference to FIGURE 1, alternating power from any convenient source (not shown) at approximately 110 volts and 60 cycles is applied over supply lines L1, L2. T designates a thermostat of the snap-acting, bimetallic type located in the space (not shown) being heated by the burner (not shown). Thermostate T responds to ambient temperature changes in such space to indicate demand for heat to be supplied by the burner (not shown). It may be noted that the thermostat in some systems may be replaced with a manual switch without affecting the novelty of the subject control. A gas valve, generally designated MGV, is illustrated diagrammatically with directional arrows indicating the flow of gas from inlet port to outlet port through the valve. The valve is of the solenoid operated type, the solenoid coil being designated SEL and connected in the anode-cathode circuit of a silicon controlled rectifier SCR. When coil SEL is energized sufficiently, the valve opens, permitting gas flow to the burner (not shown) for ignition thereat.

It should be understood that the gas at the burner (not shown) is ignited by a standing pilot PL which is manually lit initially, pilot gas being fed thereto through a manual gas cock controlled feed line, diagrammatically indicated and designated MC. Upon de-energization of main valve solenoid SEL, the valve returns to its closed condition shutting off gas to main burner (not shown). A diode D shunts solenoid coil SEL to provide a discharge path for current induced therein by collapse of the coil flux field. This maintains solenoid coil SEL energized sufficiently during alternate blocked half cycles of the applied power to prevent valve MGV from reclosing, until the coil has remained deenergized for a full cycle of applied power.

The thermocouple is designated TC and positioned for heating by the pilot flame PL. The thermocouple output power (generated when it is heated), is coupled to the gate electrode of rectifier SCR through a saturable reactor, designated generally SR. Saturable reactor SR comprises a secondary winding SEC connected across the gate-cathode electrodes of rectifier SCR, a primary winding PR connected across supply lines L1, L2 subject to thermostat contacts T and through an adjustable resistor R, and a control winding CW connected directly across thermocouple TC. A capacitor C is connected between the control and cathode electrodes of silicon controlled rectifier SCR to store energy to fire the rectifier.

The construction of saturable reactor SR is illustrated diagrammatically in more detail in FIGURE 2, wherein its iron core is seen to be separated into two core sets CS1 and CS2, each set containing six laminations of magnetic material. Each core set (CS1, CS2) includes a first outer leg OL1, a second outer leg OL2 and a central leg CL interconnected in a magnetic circuit to provide two magnetic loop paths interconnected in common by central leg CL. Primary winding PR encircles in common the first outer legs OL1 of both core sets CS1 and CS2. Similarly, secondary winding SEC encircles in common the second outer legs OL2 of both core sets CS1 and CS2. The output wires of secondary winding SEC are designated 5 and 6, while the primary winding input wires are designated 7 and 8 to illustrate their respective interconnection in the circuitry of FIGURE 1.

As is shown in FIG. 2, control winding CW of FIG. 1 comprises two coil windings CW1 and CW2 interconnected electrically in series and magnetically in opposition by an interconnecting wire 12 and output wires 9 and 10 in the thermocouple circuit of FIG. 1 as shown. Each control winding (CW1, CW2) encircles an associated central leg CL of saturable reactor core sets CS1 and CS2.

Each coil (CW1, CW2) of the control winding CW comprises four turns of wire, while primary winding PR and secondary winding SEC each comprise 600 turns.

With this saturable reactor construction, upon energization of primary winding PR, when thermocouple TC (FIGURE 2) is cold, voltages induced in control windings CW1, CW2 (due to the flow of alternating current through the primary winding) substantially cancel out to zero because of the coils being connected in magnetic opposition, one to the other and in separate core sets. Under conditions where thermocouple TC is heated, there occurs in cores CS1, CS2 approximately a 28% increase in the flux linking secondary winding SEC. This is sufficient to increase the output signal of secondary winding SEC applied to the gate electrode of rectifier SCR to approximately .6 volt, which value is sufficient to trigger anode-cathode conduction of rectifier SCR.

In operation, with reference to FIGURE 1 assume that alternating power is applied to the circuitry of FIGURE 1 by means of thermostat T closing its contacts calling for heat. Also assume that the pilot flame has not, as yet, been lit. Under such conditions, thermocouple TC remains in its cold condition, as current flows through primary winding PR of saturable reactor SR through adjustable resistor R. Such current flow causes flux to flow through core sets CS1, CS2 (FIG. 2) and intersect secondary winding SEC of the saturable reactor. This flux intersection is of insufficient magnitude to provide a sufficient voltage across the gate-cathode electrode of silicon controlled rectifier SCR to cause the rectifier to fire. This voltage magnitude is adjustable by means of an adjustable resistor R in the primary winding circuit.

It may be noted that, under such conditions, voltages induced in control windings CW1 and CW2 of saturable reactor SR substantially cancel each other to zero due to their connection in magnetic opposition. Thus, no net current flows in control winding CW and no contribution is made by the control winding to the flux flow in the cores of saturable reactor SR. This is especially important for safe operation of the fuel burner control, since otherwise the alternating voltage applied to primary winding PR could cause the induced voltages in control winding CW to saturate the reactor sufficiently to cause misfiring of silicon controlled rectifier SCR. With such firing of rectifier SCR under conditions of a cold thermocouple, the control would be reacting as if a pilot flame were detected resulting in no control of the fuel burner.

Next assume that the pilot flame PL is manually lit and remains lit, heating thermocouple TC sufficiently to provide a predetermined amount of current flow through control windings CW. Under such conditions, current flow over lines 9 and 10 and through control winding coils CW1 and CW2 (FIG. 2) provides approximately a 28% increase in the flux linking the secondary winding SEC to the primary winding PR. This produces an increase in the output signal of secondary winding SEC to the gate electrode of rectifier SCR of approximately .6 volt, which signal is sufficient to trigger rectifier SCR to conduct through its anode-cathode circuit. Upon such conduction, sufficient current flows through solenoid SEL to cause it to actuate its main valve MGV open, causing flow of gas to the burner (not shown) for ignition thereat. This provides heat to the heated space (not shown) in response to the demand of thermostat T.

The subject control provides for safe operation of the fuel burner. For example, an open circuit of capacitor C prevents the silicon controlled rectifier from being fired to conducting condition, even under conditions of a hot thermocouple. This is so, since under such conditions not enough voltage is obtained across the gate-cathode electrodes to cause the silicon controlled rectifier to conduct. Under conditions where capacitor C is shorted, rectifier SCR cannot be fired by the output of saturable reactor SR.

Under conditions where either primary winding PR or control winding CW of the saturable reactor SR is open (or shorted) insufficient voltage is induced in secondary winding SEC to fire rectifier SCR.

It may be seen from the foregoing that the subject fuel burner control, utilizing a two core saturable reactor with associated control windings connected in magnetic opposition and electrically in series for coupling a thermocouple to the gate electrode of a silicon controlled rectifier to fire the latter and energize fuel feeding means, provides an improved fuel burner control which is extremely reliable and economical to manufacture and maintain.

As changes can be made in the above described construction and many apparently different embodiments of this invention can be made without departing from the scope thereof, it is intended that all matter contained in the above description or shown on the accompanying drawing be interpreted as illustrative only and not in a limiting sense.

What is claimed is:

1. A control for a fuel burner,
 a thermocouple for generating current when heated,
 fuel feeding means operative when energized for causing fuel to flow to said burner fo rignition thereat,
 means calling for energization of said fuel feeding means,
 a silicon controlled rectifier having anode, cathode and gate electrodes,
 said fuel feeding means being connected in the anode-cathode circuit of said rectifier for energization from an alternating power source in response to said means calling for energization, a saturable reactor for coupling said thermocouple to said gate electrode of said rectifier comprising, a magnetic core comprising a plurality of laminations of magnetic material forming a magnetic circuit, a primary winding wound to encircle said core laminations said primary winding being connected for energization by said power source subject to said means calling for energization for producing magnetic flux flow in said core, a secondary winding also encircling said core laminations for generating, through intersection of said flux with said secondary winding, an output firing voltage therein, said secondary winding being connected across the gate-cathode electrodes of said rectifier for applying said firing voltage thereto, and control winding means comprising two individually wound coils, a first one of which encircles a predetermined number of said core laminations and a second one of which encircles a second predetermined number of said core laminations, said control coils being electrically connected in series and magnetically in opposition for energization by said thermocouple for controlling said generation of said output firing voltage in said secondary winding.

2. A fuel burner control as set forth in claim 1 wherein said reactor core laminations are divided into two separate cores, each having an equal number of laminations and each being separated by an electrical insulating, non-magnetic material to provide two magnetic circuits, and wherein said primary winding and secondary winding, each encircles both said cores.

3. A fuel burner control as set forth in claim 1 wherein an adjustable resistor is provided in series connection with such primary winding for adjusting the point at which said silicon controlled rectifier is caused to fire through said saturable reactor under heated conditions of said thermocouple.

4. A fuel burner control as set forth in claim 3 wherein a filtering capacitor is connected between the gate and cathode electrodes of said rectifier for preventing transient firing of said rectifier.

5. A control as set forth in claim 2 wherein each of said core sets is comprised of a first outer leg and a second outer leg connected by magnetic material to a central leg to provide two magnetic loop paths interconnected in common by said central leg, wherein said primary winding encircles both said first outer legs of said laminated core sets, and wherein said secondary winding encircles both said second outer legs of said laminated core sets, and wherein a first one of said control winding coils encircles the central leg of the first one of said laminated core sets, while said other control winding encircles the central leg of the other of said laminated core sets, and wherein said control winding coils are connected in magnetic opposition one to the other such that voltages induced in such control winding coils by energization of said primary winding substantially cancel each other to zero.

6. A control as set forth in claim 1 wherein said means calling for energization of said fuel feeding means comprise thermostat means located at the space being heated by said fuel burner and being responsive to ambient temperature variations therein for interconnecting said alternating power source to said silicon controlled rectifier circuitry and saturable reactor circuitry.

References Cited

UNITED STATES PATENTS

| | | | |
|---|---|---|---|
| 1,880,871 | 10/1932 | Denison | 431—59 |
| 2,486,306 | 10/1949 | Main | 431—59 X |
| 2,720,614 | 10/1955 | Cains | 317—133.5 X |
| 2,765,119 | 10/1956 | Marvin | 236—91 |
| 3,238,992 | 3/1966 | Forbes | 431—69 X |

FOREIGN PATENTS 630,910  11/1961  Canada.

JAMES W. WESTHAVER, *Primary Examiner.*

ROBERT A. DUA, *Assistant Examiner.*

U.S. Cl. X.R.

137—66; 317—133.5